July 21, 1964 J. W. GRAY ETAL 3,142,022

AUTOMATIC FREQUENCY CONTROL AND SWEEP CIRCUIT

Filed June 7, 1961 3 Sheets-Sheet 1

INVENTOR.
JOHN W. GRAY
JOSEPH REED

BY H. S. Mackey

ATTORNEY.

AUTOMATIC FREQUENCY CONTROL AND SWEEP CIRCUIT

Filed June 7, 1961 3 Sheets-Sheet 2

INVENTOR.
JOHN W. GRAY
JOSEPH REED
BY H. L. Mackey
ATTORNEY.

July 21, 1964 J. W. GRAY ETAL 3,142,022

AUTOMATIC FREQUENCY CONTROL AND SWEEP CIRCUIT

Filed June 7, 1961 3 Sheets-Sheet 3

INVENTOR.
JOHN W. GRAY
JOSEPH REED

BY H. A. Mackey

ATTORNEY.

United States Patent Office 3,142,022
Patented July 21, 1964

3,142,022
AUTOMATIC FREQUENCY CONTROL AND SWEEP CIRCUIT

John W. Gray, Pleasantville, and Joseph Reed, New Rochelle, N.Y., assignors to General Precision, Inc., a corporation of Delaware Filed June 7, 1961, Ser. No. 115,356
7 Claims. (Cl. 331—4)

This invention relates to automatic frequency control and sweep circuits and particularly to arrangements for initially varying the frequency of a local oscillator until its output frequency departs from a transmitter frequency by a fixed amount and thereafter controlling the local oscillator so as to maintain the fixed departure from the frequency of the transmitter.

The circuit of this invention is particularly useful for controlling the intermediate carrier frequency applied to the receiver of a Doppler radar system. The microwave transmitter of such a system is subject to frequency variations over a range of several megacycles from a variety of causes. It is necessary, however, for the intermediate frequency carrier of the receiver, of the order of 30 mc. p.s., to be held constant to within less than one megacycle per second. This is generally accomplished by providing a local oscillator having a microwave frequency less than that of the transmitter by the amount of the intermediate frequency. By means of tuned circuits and a negative feedback path the local oscillator frequency is controlled to maintain this relation, even when the transmitter frequency fluctuates. Such circuits also include provision for rapidly varying, or sweeping in sawtooth fashion, the local oscillator frequency for initial pickup of the transmitter frequency.

The inventive circuit accomplishing these objects is completely transistorized. Further, its time constant is so short that, when the transmitter is frequency modulated by reason of operation of its tube filament from a 400 c.p.s. supply, the inventive circuit will follow the 400 c.p.s. variations and maintain a constant intermediate frequency carrier. Additionally, the instant circuit contains provision for preventing lock-on to the image frequency.

The inventive circuit and cooperating parts include a mixer on which the outputs of the transmitter and voltage controlled oscillator are impressed. The mixer is followed by a discriminator having a direct potential output representative of deviations from the desired intermediate frequency. The discriminator is followed by a direct-coupled amplifier shunted by a capacitor to form a Miller integrator. The output consists of direct potential, which is applied to control the frequency of the oscillator. In the sweep mode the direct potential varies in sawtooth fashion, a trigger circuit being applied to short-circuit the amplifier at intervals and thus to repeat the sawtooth form. Thus the oscillator frequency is caused to sweep through a range relatively slowly, then to fly back abruptly to the beginning of the sweep frequency.

The discriminator used as an example contains a doubly-tuned, close-coupled resonant circuit having a center or "saddle" frequency equal to the desired intermediate frequency of, say, 30 mc. p.s. When the swept oscillator frequency becomes such that the frequency output of the mixer is the same as the intermediate frequency, the discriminator generates an error signal which, applied to the following Miller integrator, stops the sweep action of the oscillator. At the same time a Zener diode serves to disconnect the Miller capacitor. Thereafter the direct-coupled amplifier operates merely as an amplifier and, because of its feedback connection and because of the discriminator action, controls the oscillator to keep the mixer output applied to the discriminator within the 30 mc. p.s. transmission band.

The apparatus of the invention in general consists of a microwave generating tube oscillating at, for example, approximately 8800 mc. p.s., and a local oscillator tube controllable to oscillate, for example, between 8760 mc. p.s. and 8840 mc. p.s. The local oscillator output is normally mixed with the microwave generating tube output to form an intermediate beat difference frequency. In sweeping, electrical voltage control is applied to the local oscillator from the sawtooth generator, sweeping its frequency from the low end to the high end. Normally, when its frequency passes the value of 8770 mc. p.s. it heterodynes the microwave generating tube output to generate a difference frequency of 30 mc. p.s. This actuates the discriminator, causes the circuit to stop sweeping and causes it to act as an automatic frequency control. If, however, for any reason the circuit should not lock when the 8770 mc. p.s. frequency is attained, and the local oscillator frequency continues to rise, it will normally again heterodyne the transmitter with an output at 30 mc. p.s. at the "image" frequency, or when the local oscillator frequency is 8830 mc. p.s. The use of the image frequency is, however, not permissible since it would disclocate the Doppler frequency difference ultimately derived from the received microwave signal. Locking to the image frequency, therefore, constitutes false operation or misoperation.

The inventive circuit includes provision for preventing such misoperation. This provision consists of a circuit of three diodes and several resistors so arranged that, if the sweeping local oscillator output encounters the image frequency, locking does not occur. Instead, the sweep sawtooth is returned to its initial point and a fresh sweep is started.

The principal object of this invention is to provide an automatic gain control and sweep circuit arranged to control the output frequency of a voltage-controlled oscillator.

Another object of this invention is to so control the frequency of a local oscillator of a Doppler radar that its frequency subtracted from the transmitter frequency will equal a selected intermediate frequency.

Still another object of the invention is to sweep the local oscillator frequency until the stated frequency difference is attained, when the circuit changes from sweep mode to the gain control mode.

Still another object of the invention is, in the event the image frequency is encountered during sweeping action, to prevent lock-on thereto and to commence a new sweep.

A further understanding of this invention may be secured from the following detailed description and associated circuits, in which.

Figure 1:
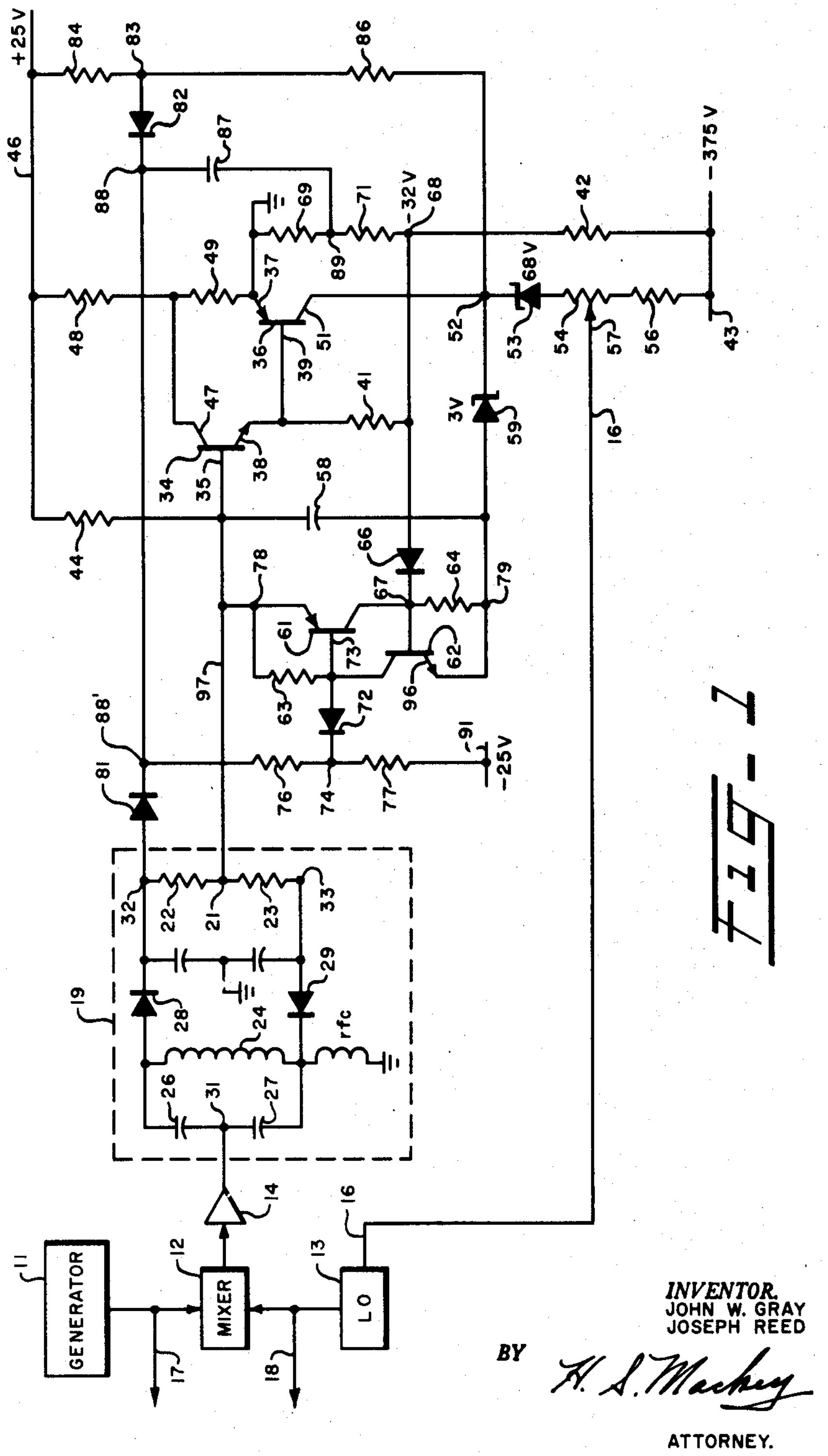
FIGURE 1 is a schematic diagram of an embodiment of the invention.

Referring now to FIGURE 1, a portion of the transmitter of a Doppler radar system is shown including a microwave generator 11, mixer 12, local oscillator 13 and tuned intermediate frequency amplifier 14. As an example, the generator 11 includes a magnetron tube having a nominal frequency of 8800 mc. p.s., but which may depart from this frequency by 15 mc. p.s. because of manufacturing variations or because of temperature and pressure changes in its environment. Its filament is operated on a 400 c.p.s. supply, and this may frequency modulate its output with excursions of a megacycle or so. The local oscillator 13 is a klystron tube which is mechanically adjustable in frequency and which is also adjustable and controllable in frequency by the application of negative potential from conductor 16. An increase of the negative control potential will increase the klystron frequency. This tube normally is operated at a frequency below that of the microwave generator 11 by the amount of the receiver intermediate frequency carrier which may, for example, by at 30 mc. p.s. Thus, if the transmitter has a nominal frequency of 8800 mc. p.s. the local oscillator 13 frequency is 8770 mc. p.s. The amplifier 14, tuned to the intermediate frequency of 30 mc. p.s., has a bandwidth of 1.7 mc. p.s.

The output of the transmitter 11 is applied, through the conductor 17, to the transmitting antenna. The output of local oscillator 13 is applied, through conductor 18, to heterodyne the received signal, which is at the transmitting microwave frequency except that it is modified by the Doppler difference frequency. The heterodyned output is at the intermediate carrier frequency plus or minus the Doppler difference frequency. The function of the instant automatic frequency control circuit is to maintain the intermediate carrier frequency constant enough to remain within the receiver IF amplifier bandwidth, notwithstanding changes in the transmitting frequency.

The output of amplifier 14 is applied to a discriminator 19 having the function of emitting, at the junction 21 of equal resistors 22 and 23, a direct potential representing by its polarity and amplitude the departure of the frequency of the applied signal from a selected frequency. The selected frequency is determined by resonant circuits including the inductor 24 and capacitors 26 and 27. The discriminator includes two rectifying diodes 28 and 29.

In the operation of this discriminator, when the frequency at the input terminal 31 is higher than the selected frequency the positive potential at junction 32 is greater than the negative potential at point 33. The potential at the intermediate junction is therefore positive. When the input frequency is below the selected frequency, the potential at junction 21 is negative, but when the input frequency exactly equals the selected frequency the potential at junction 21 is zero. The potentials at junctions 21 and 32 and at point 33 are zero also when the input frequency is so different from the resonant frequencies that no currents whatever flow through the diodes 28 and 29.

The discriminator output at junction 21 is applied to the input base terminal 35 of a direct-coupled amplifier comprising transistors 34 and 36. The base 35 is biased by being connected through a 1-megohm resistor 44 to a +25-volt bus 46. Transistor 34 is connected as an emitter follower and transistor 36 has its emitter 37 grounded and common to its input and output circuits. The emitter 38 of transistor 34 is connected to the base 39 of transistor 36, and sufficient current is furnished for proper operation of the emitter follower by also connecting the emitter 8 through resistors 41 and 42 to a −375-volt source represented by a bus 43. The collector 47 of the emitter follower is connected through a voltage divider 48/49 to the +25-volt bus 46. It is connected thus instead of directly to bus 46 to prevent overdriving the transistor 36. The collector 51 of transistor 36 is connected through a 68-volt Zener diode 53, a potentiometer 54 and a resistor 56 to the −375-volt bus 43 and the output of the amplifier is imposed on the junction 52. The slider 57 of the potentiometer 54 is connected through the control conductor 16 to control the frequency of local oscillator 13.

The input and output terminals of the direct-coupled amplifier are joined by a Miller integrating capacitor 58. A 3-volt Zener diode 59 is connected in series between the capacitor 58 and the output terminal 52.

A switch circuit comprising transistors 61 and 62 is connected between the two terminals of the capacitor 58. This switch circuit also includes the resistors 63 and 64. A diode 66 is connected between the base 67 of transistor 62 and the junction 68 of a divider composed of resistors 69, 71 and 42 connected between the bus 43 and ground. The resistances of resistors 69, 71 and 42 are such that the junction 68 potential is held at −32 volts. Another diode 72 is connected between the base 73 of transistor 61 and the junction 74 of a voltage divider consisting of resistors 76 and 77.

In the operation of this switch circuit, when no potential is applied across either resistor, 63 or 64, which is the case when diodes 66 and 72 are nonconductive, the transistors 61 and 62 are also nonconductive, and for the present purpose the resistance between the terminals 78 and 79 can be considered as infinite. If, now, a potential of a fraction of a volt and of the correct polarity by applied to either resistor, and in addition if terminal 79 is at a negative potential with respect to terminal 78, then one transistor will begin to conduct and in turn will cause the other transistor to begin to conduct. The action, once started, is regenerative and both transistors very quickly become fully conductive, applying a short circuit of about 200 ohms across the capacitor 58.

As the capacitor 58 discharges through the switch transistors 61 and 62 and their associated resistors 63 and 64, and when the discharge current falls to a selected low amount, determined by the resistances of the resistors 63 and 64, this current, together with the small current from bus 46 through resistor 44, becomes too small to support the low-impedance condition of the switch. That is, the decreased potential drops through resistors 63 and 64 no longer causes the transistors 61 and 62 to be as highly conductive as they were. This action, too, is regenerative, and the two transistors very rapidly become completely nonconductive.

A circuit to prevent locking to the image frequency comprises diodes 81 and 82 connected between the discriminator junction 32 and the junction 83 of a voltage divider consisting of resistors 84 and 86 connected between the +25-volt bus 46 and the amplifier output junction 52. A large capacitor 87 is connected between the diode junction 88 and the junction 89 of resistors 69 and 71. This anti-lock circuit also includes the diode 72 and voltage divider 76/77 connected between junction 88′ and a negative 25-volt potential bus 91.

Figures 2A, 2B:
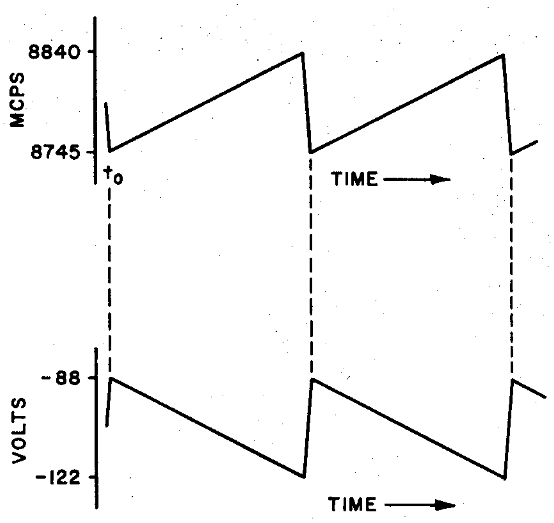
FIGURES 2A, 2B and 3 are graphs illustrating the operation of the invention.

In the operation of the circuit of FIGURE 1, let the generator 11 frequency be 8800 mc. p.s. In the sweeping mode the local oscillator 13 output frequency is swept from 8745 mc. p.s. to 8840 mc. p.s. in about 180 milliseconds, then very rapidly flies back to 8745 mc. p.s. This cycle is shown in FIGURE 2A. The corresponding negative potentials which are applied to the local oscillator by conductor 16 to produce this sweep are shown in FIGURE 2B.

Figure 3:
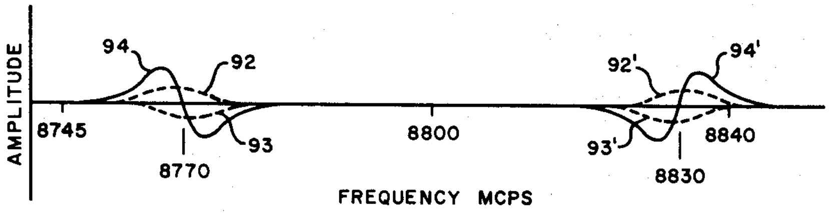

At the beginning of such a sweep, at time $t_0$, FIGURE 2, the mixing of the local oscillator frequency of 8745 mc. p.s. and the transmitter frequency of 8800 mc. p.s., with modulation, produces a difference frequency of 55 mc. p.s. This is too far from the resonant points of the discriminator tuned circuits to produce any potentials in them. This frequency is indicated in FIGURE 3 at the abscissa 8745. As the local oscillator frequency increases, the difference frequency grows less until in the vicinity of 30 mc. p.s. difference one resonant circuit has potential induced in it. This potential, after rectification by the diode 28, FIGURE 1, is shown by the dashed line 92, FIGURE 3. The rectified potential of the other resonant circuit is shown by the dashed line 93. The differences of potentials 92 and 93 are represented by the discriminator output curve 94 drawn to a slightly different ordinate scale for clarity. The potentials of this curve are found at the discriminator output terminal 21 and constitute the direct current output error potentials of the discriminator.

When the local oscillator frequency has passed above 8800 mc. p.s., difference potentials are again generated, the curves representing them, 92′, 93′ and 94′, being mirror images about 8800 of the respective curves 92, 93 and 94. The error null frequency of curve 94' is commonly termed the image frequency.

At the time of sweep start, $t_0$, at 8745 mc. p.s. local oscillator frequency, no currents pass through the diodes 28 and 29 because no potentials are applied to them. Since these diodes are nonconductive, the discriminator junctions 21 and 32 are at zero potential.

At the beginning of the sweep the collector 51 of transistor 36 is at approximately zero potential, and the junction 83 is at about +6 volts. By the end of the sweep this junction attains about −20 volts, so that the diode 82 is conductive only during the early part of the sweep and junction 88 of capaictor 87 charges to a positive potential between zero and +6 volts, being kept from rapid fluctuations by the smoothing effect of the large capacitor 87. Thus, the diode 81 is back biased and nonconductive. The resistors 76 and 77 have such value that normally their junction 74 does not go below ground potential during the sweep. The diode 72 therefore remains nonconductive.

At the beginning of the sweep the base-emitter of transistor 36 has a potential drop of about −0.6 volt, so that its base 39 and the emitter 38 of transistor 34 assume this potential. The potential drop between the base 35 and emitter 38 then puts the base 35 at a potential of about −0.1 volt. Since the junction 52 is at about zero volts, and the junction 68 is at about −32 volts, with the transistors 61 and 62 nonconducting, the diode 66 is back biased and is nonconductive.

During the sweep, if no signal is picked up to produce a discriminator output, the amplifier input terminal 35 is isolated except for its connection through the 1-megohm resistor 44 to the +25-volt potential bus 46. It is the current applied through this resistor to the base 35 which causes the sweep action of the amplifier shunted by the capacitor 58, acting as an integrator. The current from the positive bus 46 is not only applied to the base 35 but also flows into the capacitor 58, gradually raising the potential of the capacitor plate and of the base from about −0.1 volt at the beginning of the sweep to about +0.1 volt at the end. This change is amplified to produce at the collector 51 a potential of about zero at the beginning of the sweep to about −33 volts at the end.

The sweep is terminated as follows. When the collector 51 has attained a potential of about −33 volts, the potential at junction 79 is about ½ volt more positive, or −32½ volts, because of the forward drop through the Zener diode 59. Thus the difference between this voltage and about +32 volts at junction 68, or about ½ volt forward potential, is effective on diode 66 and some current flows from the base terminal 67 through resistor 64 to junction 79. The potential drop in resistor 64 constitutes a potential difference between base 67 and emitter 96. This causes the transistor 62 to draw current through resistor 63. The switch circuit thereafter very rapidly becomes conductive and discharges the capacitor 58, returning the base 35 to −0.1 volt potential and the collector 51 to zero potential.

If the sweep encounters a discriminator output signal as indicated by the waveform 94, FIGURE 3, the sweep is stopped, the integrator is converted to a simple amplifier, and the amplifier is locked to the discriminator signal. The sweep first generates a discriminator positive potential of, perhaps, +3 volts, in accordance with waveform 92, FIGURE 3, which appears at junction 32. A short time later negative potential of perhaps −1 volt appears at junction 33, in accordance with waveform 93, FIGURE 3. Therefore a current flows in resistors 22 and 23 from junction 32 to junction 33 and the midjunction 21 becomes positive. Some current therefore also flows in conductor 97 toward base 35, accelerating the sweep voltage change. As the local oscillator is swept through 8770 mc. p.s. the potential at junction 21 becomes zero, then becomes negative, and the current in conductor 97 stops, then reverses. This stops the flow of charging current from conductor 97 into the capacitor 58 and stops the current flow into the base terminal 35. This is turn stops the change of potential at base 35 and at output collector 51, and stops the flow of positive charging current through the Zener diode 59 out of the capacitor 58. Since the potential in conductor 16 now stops changing, the local oscillator 13 output frequency stops changing and the discriminator output terminal 21 is held at its attained very slightly negative potential. Thus the amplifier is held locked to the local oscillator and no current flows into or out of the integrating capacitor 58.

The time constant of the feedback loop including conductor 16 is so short that the frequency modulation excursions of generator 11, produced by passing the 400 c.p.s. current through its filament, are followed by the local oscillator 13, which fluctuates correspondingly, so that corresponding frequency variations do not appear in the 30 mc. p.s. carrier at amplifier 14 or in the receiver served by the conductors 17 and 18. The fluctuations at junction 52 thus necessary in the automatic frequency control mode of operation are kept from entering the integrating capacitor 58 by the 3-volt Zener diode 59.

If, during the sweep, the zero point of the waveform 94, FIGURE 3, is missed, or if the sweep is started with the local oscillator frequency higher than 8770 mc. p.s., the circuit as so far described in operation could lock to the beginning or lowest frequency point of the image form 93', FIGURE 3. The diodes 72, 81 and 82, FIGURE 1, and associated components prevent this. As the local oscillator frequency rises above 8800 mc. p.s., it encounters the potential of waveform 93', FIGURE 3, before it encounters the waveform 92', so that a negative potential is generated and applied to the discriminator junction 33, FIGURE 1, and appears at the output junction 21, stopping the sweep action. At the same time, since the sweep is in its latter half, the potential at junction 83 is negative and the diode 82 is nonconductive. Since the potential at junction 32 is zero, diode 81 is back biased and nonconductive, and, contrary to the case of proper lock-on, junction 32 cannot contribute positive potential to junction 88'. As the capacitor 87 discharges through the resistors 76 and 77, the potential of junction 74 therefore drops until, at about −1 volt, a slight current is drawn through diode 72. The resulting drop in resistor 63 causes transistor 61 to become slightly conductive. This very rapidly causes complete switch operation, short circuiting and discharging the integrating capacitor 58 and returning the system to the beginning of another sweep cycle. False lock-on to the image frequency is thus prevented.

Figure 4:
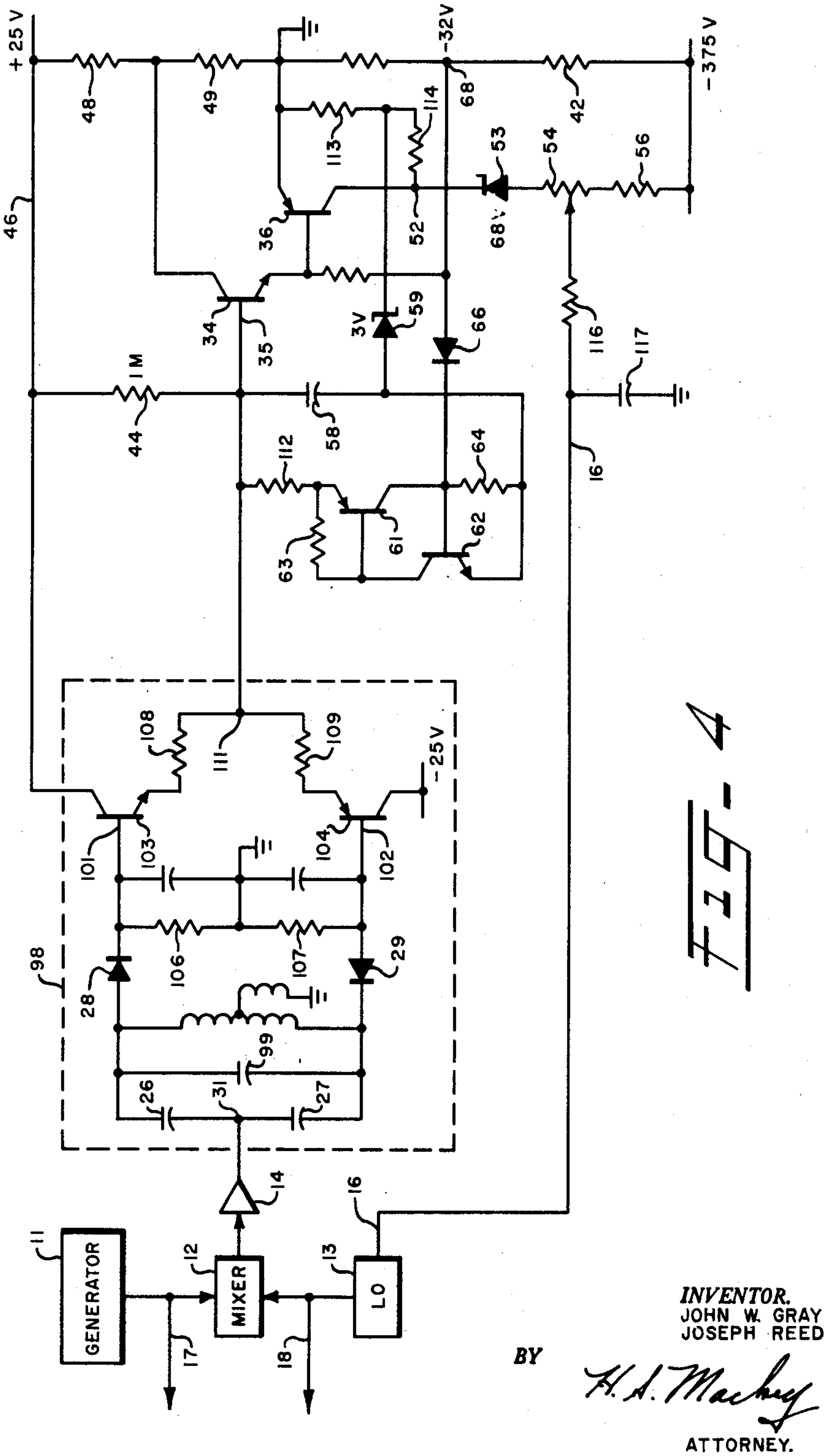
FIGURE 4 is a schematic diagram of a modified embodiment of the invention.

It is possible to avoid false lock-on to the image frequency by adjusting the sweep limits with care, so that the local oscillator will not normally sweep through the image frequency. It is also possible to improve the discriminator action by adding emitter follower transistors to it. Such an embodiment is shown in FIGURE 4. It omits the false lock-on circuit and incorporates transistor emitter followers in the discriminator. FIGURE 4 also includes a small capacitor and resistor added to prevent the possibility of high frequency loop oscillation. Components identical with those of FIGURE 1 have the same reference characters.

In the discriminator 98, the capacitor 99 facilitates design. The diodes 28 and 29 are connected to the bases 101 and 102 of two transistors 103 and 104 connected as emitter followers. The resistors 106 and 107 provide base bias. The equal emitter resistors 108 and 109 are joined at junction 111, which is the discriminator output terminal. A 100-ohm resistor 112 is added to limit the discharge current of capacitor 58 when short circuited by the switch circuit. The connection of the 3-volt Zener diode 59 to the junction 52 is made through a voltage divider consisting of resistors 113 and 114 to control the sweep voltage range. The feedback to the local oscillator 13 is taken through a resistor 116, with capacitor 117 in shunt, to stabilize the feedback loop.

In the operation of the circuit of FIGURE 4, the addition of the transistors 103 and 104 greatly improves the impedance match to the amplifier input base 35, which may be translated to a large increase of power delivered by the discriminator to the amplifier during lock-on and in the automatic frequency control mode of operation.

What is claimed is:

1. An automatic frequency control and sweep circuit comprising, a high frequency signal generator, a local oscillator, mixer means having the outputs of said signal generator and said local oscillator impressed thereon and producing an intermediate frequency signal therefrom, discriminator means having said intermediate frequency signal impressed thereon and producing an output potential having a sense and magnitude dependent within limits on the direction and amount of departure of said intermediate frequency signal from a selected value, an amplifier having a capacitor connected between its input and output, means for supplying a charging potential to said capacitor whereby said amplifier in conjunction therewith acts as an integrator and produces a substantially linearly varying output, switch means connected to the output of said amplifier and across said capacitor for discharging said capacitor when the output of said amplifier reaches a preselected value and for initiating a new integration cycle, means for controlling the frequency of said local oscillator by the output of said amplifier, and means interconnecting the output of said discriminator means and the input of said amplifier whereby the output of said discriminator means overrides said charging potential and terminates said integrator action.

2. An automatic frequency control and sweep circuit comprising, a high frequency signal generator, a local oscillator, mixer means having the outputs of said signal generator and said local oscillator impressed thereon and producing an intermediate frequency signal therefrom, discriminator means having said intermediate frequency signal impressed thereon and producing an output potential having a sense and magnitude dependent within limits on the direction and amount of departure of said intermediate frequency signal from a selected value, an amplifier having a capacitor connected between its input and output, means for supplying a charging potential to said capacitor whereby said amplifier in conjunction therewith acts as an integrator and produces a substantially linearly varying output, switch means connected to the output of said amplifier and across said capacitor for discharging said capacitor when the output of said amplifier reaches a preselected value and for initiating a new integration cycle, means for controlling the frequency of said local oscillator by the output of said amplifier, means interconnecting the output of said discriminator means and the input of said amplifier for causing the output of the discriminator to override said charging potential and terminate said integrator actions when the output of said discriminator varies from one sense toward the opposite sense, and means interconnecting said discriminator means and said amplifier for preventing said overriding action when the initial output of said discriminator varies from said opposite sense toward said one sense.

3. An automatic frequency control and sweep circuit comprising, a high frequency signal generator, a local oscillator, mixer means having the outputs of said signal generator and said local oscillator impressed thereon and producing an intermediate frequency signal therefrom, discriminator means having said intermediate frequency signal impressed thereon and producing an output potential having a sense and magnitude dependent within limits on the direction and amount said intermediate frequency departs from a selected value, an amplifier having a capacitor connected between its input and output, a resistor connecting the amplifier input terminal of said capacitor to a source of direct current for supplying a charging current to said capacitor and causing said amplifier to function as an integrator producing a substantially linearly increasing ouptut, switch means connected across said capacitor and operated by said amplifier output to discharge said capacitor when said amplifier output reaches a preselected value, means for controlling the frequency of said local oscillator by the output of said amplifier, and means including an interconnection between said discriminator means output and said amplifier input for terminating the flow of charging current in said capacitor and causing said amplifier output to become dependent solely on the output of said discriminator means.

4. An automatic frequency control and sweep circuit comprising, a high frequency signal generator, a local oscillator, mixer means having the outputs of said signal generator and said local oscillator impressed thereon and producing an intermediate frequency signal therefrom, discriminator means having said intermediate frequency signal impressed thereon and producing an output potential having a sense and magnitude dependent within limits on the direction and amount said intermediate frequency departs from a selected value, an amplifier having a capacitor connected between its input and output, a resistor connecting the amplifier input terminal of said capacitor to a source of direct current for supplying a charging current to said capacitor and causing said amplifier to function as an integrator producing a substantially linearly increasing output, switch means connected across said capacitor and operated by said amplifier output to discharge said capacitor when said amplifier output reaches a preselected value, means for controlling the frequency of said local oscillator by the output of said amplifier, means including an interconnection between said discriminator means output and said amplifier input for terminating the flow of charging current in said capacitor when the output of the discriminator varies in one directional sense, and means interconnecting said discriminator means and said amplifier for preventing the termination of charging current flow when the initial output of the discriminator varies in the opposite directional sense.

5. An automatic frequency control and sweep circuit comprising, a high frequency signal generator, a local oscillator, mixer means having the outputs of said signal generator and said local oscillator impressed thereon and producing an intermediate frequency signal therefrom, discriminator means having said intermediate frequency signal impressed thereon and producing an output potential having a sense and magnitude dependent on the direction and amount said intermediate frequency departs from a selected value within the pass band of said discriminator means, an amplifier, a capacitor and a diode connected in series between the input and output of said amplifier with said diode poled to be most conductive in the direction toward said amplifier output, a resistor interconnecting a source of potential and the amplifier input terminal of said capacitor for supplying a flow of charging current to said capacitor, switch means connected across said capacitor and operated by the output of said amplifier to discharge said capacitor when said amplifier output reaches a preselected value, means for controlling the frequency of said local oscillator by the output of said amplifier, and a direct connection between the output of said discriminator and the amplifier input terminal of said capacitor whereby the flow of charging current thereto is interrupted by the production of a discriminator output potential of a selected sense.

6. An automatic frequency control and sweep circuit comprising, a high frequency signal generator, a local oscillator, mixer means having the outputs of said signal generator and said local oscillator impressed thereon and producing an intermediate frequency signal therefrom, discriminator means having said intermediate frequency signal impressed thereon and producing an output potential having a sense and magnitude dependent on the direction and amount said intermediate frequency departs from a selected value within the pass band of said discriminator means, an amplifier, a capacitor and a diode connected in series between the input and output of said amplifier with said diode poled to be most conductive in the direction toward said amplifier output, a resistor interconnecting a source of potential and the amplifier input terminal of said capacitor for supplying a flow of charging current to said capacitor, switch means connected across said capacitor and operated by the output of said amplifier to discharge said capacitor when said amplifier output reaches a preselected value, means for controlling the frequency of said local oscillator by the output of said amplifier, a direct connection between the output of said discriminator and the amplifier input terminal of said capacitor whereby the flow of charging current thereto is interrupted by the production of a discriminator output potential passing through a null from one sense to an opposite sense, and means interconnecting said discriminator means and said amplifier for preventing termination of said charging current flow when the discriminator output initially is of said opposite sense without having first passed through said one sense.

7. An automatic frequency control and sweep circuit comprising, a generator, a voltage-controlled oscillator, mixer means for heterodyning the outputs of said generator and of said oscillator to form an output signal having a difference frequency, discriminator means connected thereto tuned to respond within limits to a selected frequency spectrum and having an output direct-current amplitude representing the departure within said limits of said difference frequency from said selected frequency, said discriminator means having an augend output terminal and a sum output terminal, said output direct-current amplitude appearing at said sum terminal, amplifier means connected to said sum terminal for amplifying said direct current amplitude, capacitor means shunting said amplifier means, a resistor having one end connected to a source of direct current and the other connected to the input of said amplifier means, switch means actuated by the output of said amplifier means at a selected potential, said switch means being connected to said capacitor means whereby when actuated the capacitor means is short circuited, a feedback connection from the output of said amplifier means to control said voltage-controlled oscillator, a first diode having one terminal connected to said augend terminal, a second diode having one terminal connected for operation from the output of said amplifier means, a third diode having one terminal connected to an input of said switch means, and a connection joining the other terminals of said first, second and third diodes whereby said automatic frequency control and sweep circuit is prevented from locking to the image heterodyne frequency.

References Cited in the file of this patent

UNITED STATES PATENTS 2,686,877 Lawson ---------------- Aug. 17, 1954